(12) United States Patent
Lu

(10) Patent No.: US 6,600,827 B2
(45) Date of Patent: Jul. 29, 2003

(54) EXTERNALLY MOUNTED SPEAKER FOR NOTEBOOK COMPUTER

(75) Inventor: Liang-Chi Lu, Taijhong (TW)

(73) Assignee: Kuan-Yu Chou, Taipei (TW)

( * ) Notice: Subject to any disclaimer, the term of this patent is extended or adjusted under 35 U.S.C. 154(b) by 16 days.

(21) Appl. No.: 09/968,874

(22) Filed: Oct. 3, 2001

(65) Prior Publication Data

US 2003/0063765 A1 Apr. 3, 2003

(51) Int. Cl.[7] .............................................. H04R 25/00
(52) U.S. Cl. ...................... 381/388; 381/333; 381/306; 248/316.4; 248/918; 361/683
(58) Field of Search ............................... 381/306, 308, 381/87, 332–336, 345, 351, 182, 385, 386, 388, 392, 395, 190–191, 396; 361/680–686, 724–734; 248/231.41, 231.81, 316.4, 316.8, 442.2, 918

(56) References Cited

U.S. PATENT DOCUMENTS

| | | | | |
|---|---|---|---|---|
| 5,349,575 A | * | 9/1994 | Park | 369/1 |
| 5,604,663 A | * | 2/1997 | Shin et al. | 361/686 |
| 5,675,426 A | * | 10/1997 | Meisner et al. | 348/838 |
| 5,701,347 A | * | 12/1997 | Daniels et al. | 381/300 |
| 5,812,369 A | * | 9/1998 | Hsu et al. | 361/683 |
| 5,825,614 A | * | 10/1998 | Kim | 361/683 |
| 5,833,186 A | * | 11/1998 | Kosmoski et al. | 248/221.11 |
| 5,838,537 A | * | 11/1998 | Lundgren et al. | 361/683 |
| 5,880,928 A | * | 3/1999 | Ma | 361/683 |
| 5,947,434 A | * | 9/1999 | Kosmoski et al. | 248/298.1 |
| 6,005,642 A | * | 12/1999 | Meisner et al. | 348/838 |
| 6,040,978 A | * | 3/2000 | Spencer | 361/683 |
| 6,043,976 A | * | 3/2000 | Su | 361/686 |
| 6,078,497 A | * | 6/2000 | Derocher et al. | 361/683 |
| 6,151,206 A | * | 11/2000 | Kato et al. | 361/681 |
| 6,151,401 A | * | 11/2000 | Annaratone | 381/388 |
| 6,181,550 B1 | * | 1/2001 | Kim | 361/683 |
| 6,191,942 B1 | * | 2/2001 | Lee et al. | 361/683 |
| 6,201,878 B1 | * | 3/2001 | Azima et al. | 381/386 |
| 6,243,260 B1 | * | 6/2001 | Lundgren et al. | 361/683 |
| 6,243,473 B1 | * | 6/2001 | Azima et al. | 381/152 |
| 6,292,358 B1 | * | 9/2001 | Lee et al. | 361/683 |
| 6,304,435 B1 | * | 10/2001 | Hsu | 361/683 |
| 6,338,182 B1 | * | 1/2002 | Tseng et al. | 16/386 |
| 6,449,146 B1 | * | 9/2002 | Ryuuzaki | 361/683 |

\* cited by examiner

*Primary Examiner*—Curtis Kuntz
*Assistant Examiner*—P. Dabney
(74) *Attorney, Agent, or Firm*—Rabin & Berdo, P.C.

(57) ABSTRACT

An externally mounted speaker for a notebook computer mainly has a moveable speaker box assembled on the back side of a screen; when the screen is in a vertical position, the speaker box can be pulled out of a box mounting slot to protrude outward and face directly across the user for obtaining the most stereo sound effect.

3 Claims, 18 Drawing Sheets

EXTERNALLY MOUNTED SPEAKER FOR NOTEBOOK COMPUTER

BACKGROUND OF THE INVENTION

1. Field of the Invention

The present invention, providing an externally mounted speaker for a notebook computer, more specifically a speaker, designed to be assembled to two sides of a screen for achieving the most stereo and realest sound effect, to be received on the back side of a screen and also space-saving, is truly an excellent design and incomparable with a common built-in speaker or an externally connected speaker box.

2. Description of the Prior Art

Accordingly, the speaker of a notebook computer of prior art is designed to be built-in; all the members are disposed inside the main set case and several sound through holes are disposed on the case to allow the sound to be transmitted from those holes; however, since the speaker of this kind of structure situates inside the main set case and mingled with other electronic parts in the same space, the echoing effect is of course not very good; more especially, the said sound through holes are usually disposed at one corner on the keyboard; when in use, the sound quality is transmitted outward from the flat plane of the main set case other than directly toward the front aspect of the user, therefore, the stereo of the sound effect is not desirable and that is the common shortcomings of the prior art.

Although externally connecting a speaker box onto a notebook computer can improve the sound quality, how to carry it becomes a major issue; more especially, when in use, it is necessary to find a socket for plugging, a location for placing the speaker and the electric wire is subject to get tangled around; so it is very inconvenient in use and not the original design of a notebook computer; that is the major shortcoming of the prior art.

SUMMARY OF THE INVENTION

Therefore, the objective of the present invention is to design an externally mounted speaker box capable of being folded to be received in the computer and extended for using, otherwise, received and space-saving to radically solve the difficult situation of the prior art.

For achieving the above-mentioned objectives, the present invention is implemented as follows:

A connecting piece and two sliding members are disposed, wherein a concave opening is disposed inwardly on the outer lateral end of the sliding member; two sides of one of the ends of the two speaker boxes are disposed with pivots; the pivot is pivotally jointed to the outer side end portion of the concave opening permitting the speaker box to be embedded in the sliding member and also capable of being pulled outward; two retaining sides are disposed downward at the end portions of the two sliding members; on the sliding member, switches for the electric source, the sound control and sockets are disposed to fitly assemble with the computer.

Two ends of the connecting piece extend into the sliding member and fork to form a convex portion respectively; a resilient element is disposed at the rear end of the convex portion; when two sliding members are respectively pulled along the two ends of the connecting piece, the resilient element is compressed between the convex portion and the rib side at the end portion of the sliding member to have a inward pulling force to transversely mount the two sliding members on the screen, so the retaining sides with convex tenons of the sliding members are fixedly retained; after being connected with proper circuits, the speaker box can be lifted toward the most suitable sound transmitting area.

Another embodied structure can be implemented by another method; an insert slot is disposed on the back side of the screen of the computer main set; a main body board can be inserted into the said insert slot; a box mounting slot is disposed at a proper position on the main body board; the speaker box with a pivot is pivotally disposed on one side inside the box mounting slot; the said speaker box can be received inside the box mounting slot; when activating the notebook computer and standing the screen vertically, the speaker box can be pulled out from the box mounting slot on the back plane; the pulled out speaker box protrudes and faces directly across the user for obtaining the most stereo sound effect.

In order to enable a further understanding of the content of the present invention, the brief description of the drawings below is followed by the detailed description of the preferred embodiment.

DETAILED DESCRIPTION OF THE PREFERRED EMBODIMENTS

Figure 1:
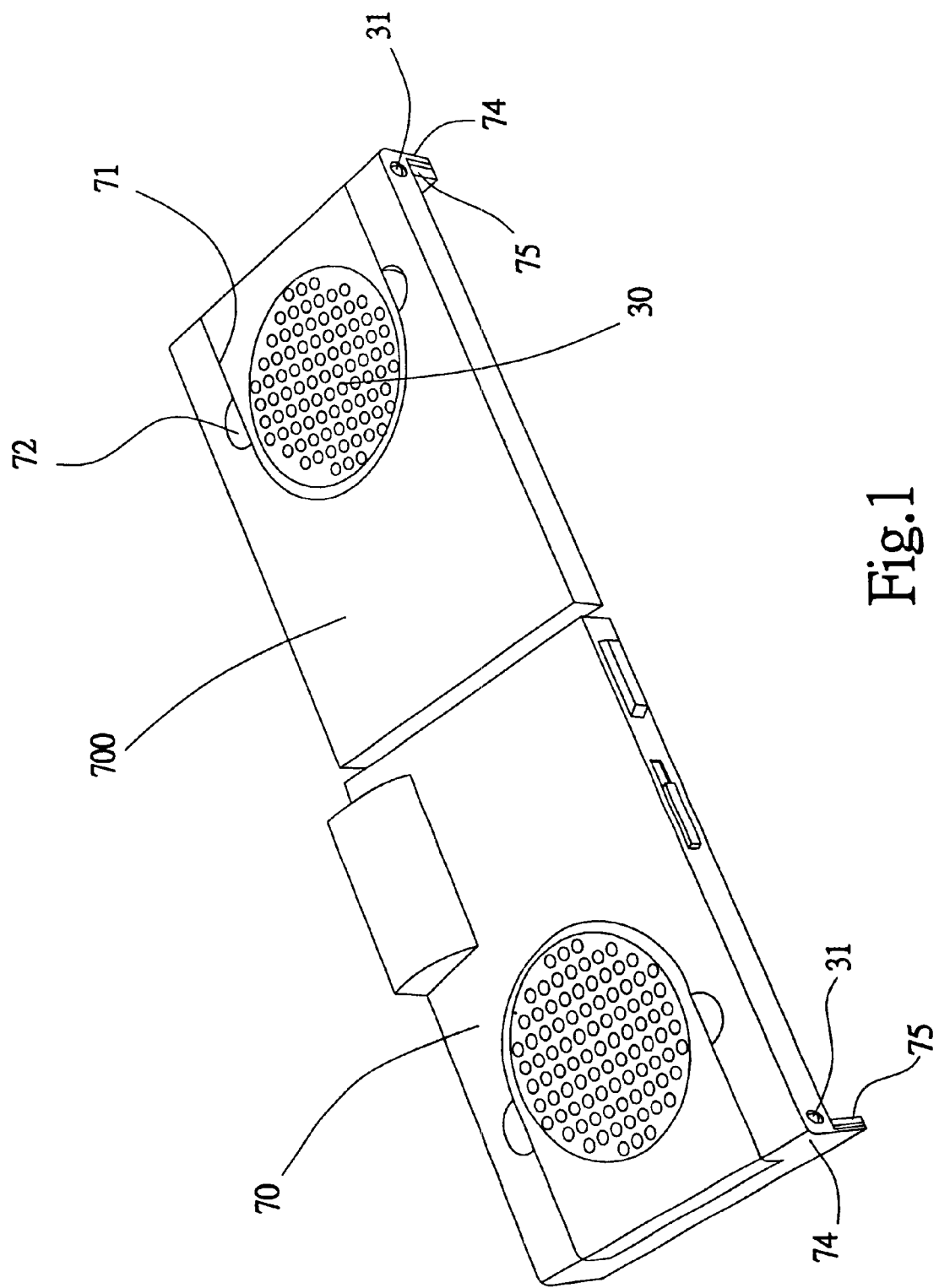
FIG. 1 is an external view drawing of the structure of the present invention.
Figure 4:
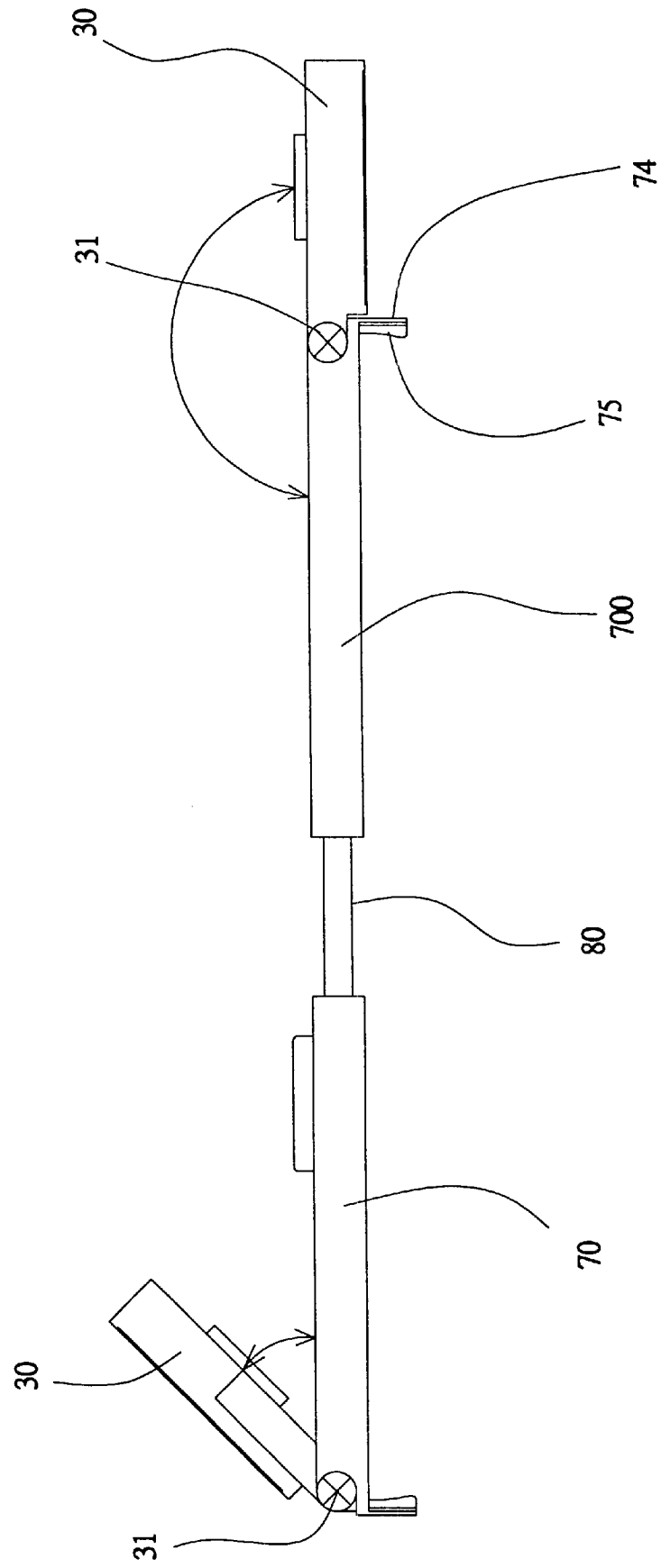
FIG. 4 is a structural drawing of an expanded speaker box.
Figure 5:
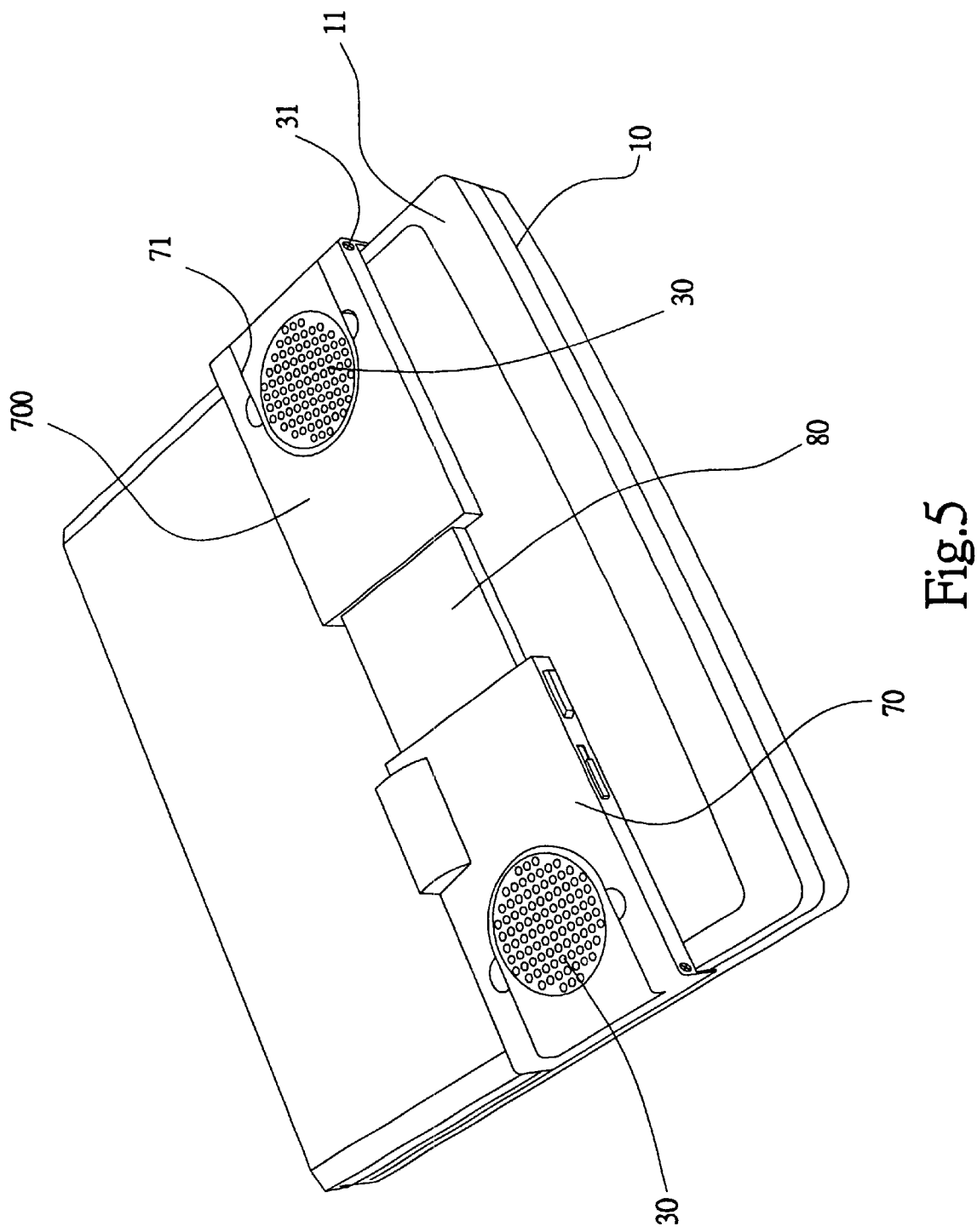
FIG. 5 is a drawing of an exemplary embodiment of the present invention.

Referring to FIGS. 1 and 5, the present invention mainly has sliding members (70, 700) disposed respectively at the two ends of a connecting piece (80), wherein concave openings (71) are disposed inwardly on the outer lateral ends of the sliding members (70, 700); referring to FIGS. 4 and 5, two speaker boxes in the form of the concave opening (71) are disposed; two sides of one of the ends of the two speaker boxes (30) are disposed with pivots (31); the pivot (31) is pivotally coupled to the outer side end portion of the concave opening (71) permitting the speaker box (30) to be embedded in the sliding member (70); in addition, an arcuate slot (72) is disposed at a proper position of the concave opening (71) to allow the user's hand to pull the speaker box (30) from that area, as shown in FIG. 4, to lift toward the outer sides; two retaining sides (74) are disposed downward at the end portions of the two sliding members (70, 700); a convex tenon easy for retaining is disposed toward the inner side of the retaining side (74); on the sliding member (70), switches for the electric source, the sound control and the sockets are disposed to fitly assemble with the computer.

Figure 2:
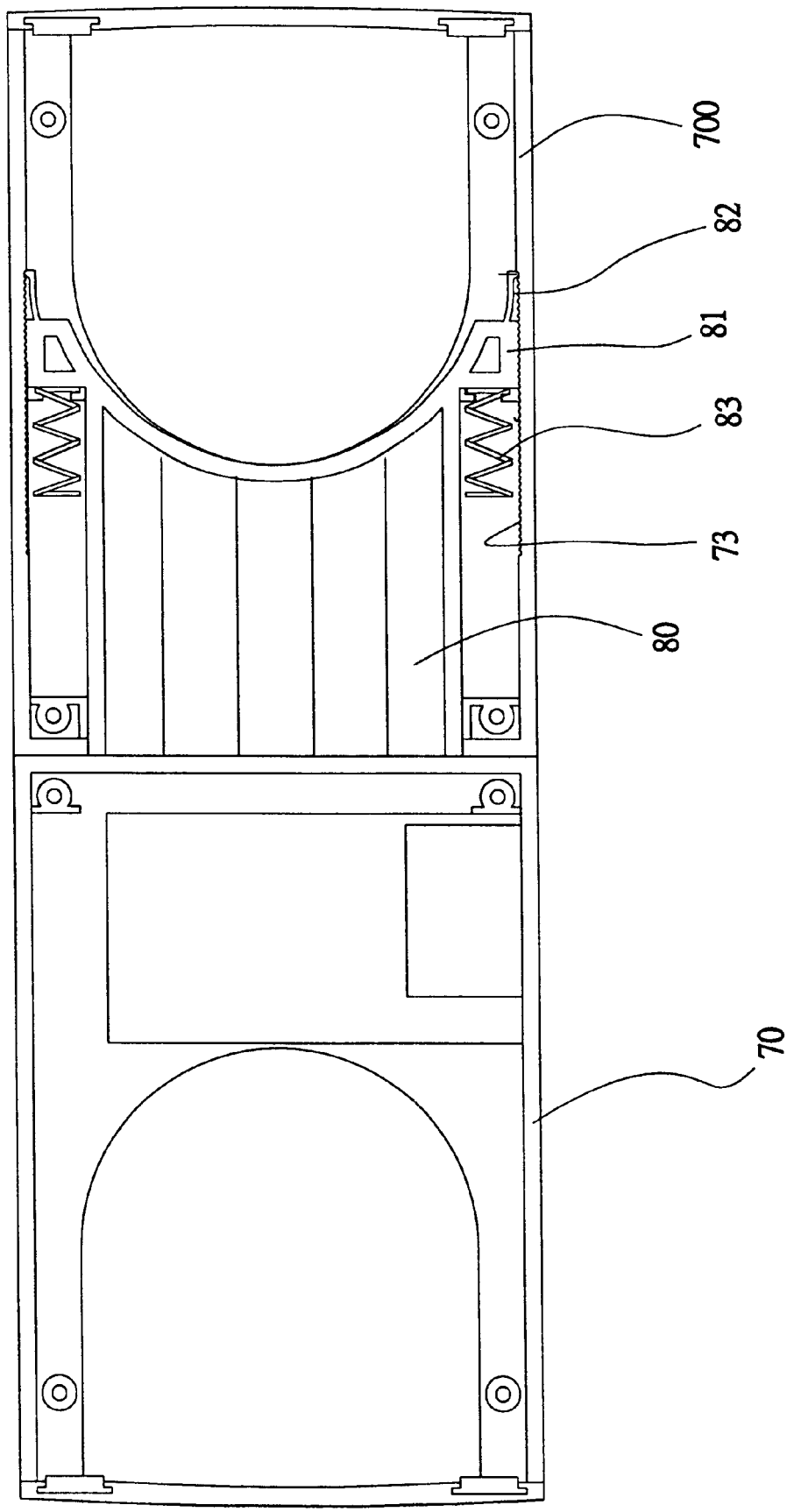
FIG. 2 is a bottom view drawing of the inner structure of the present invention.
Figure 3:
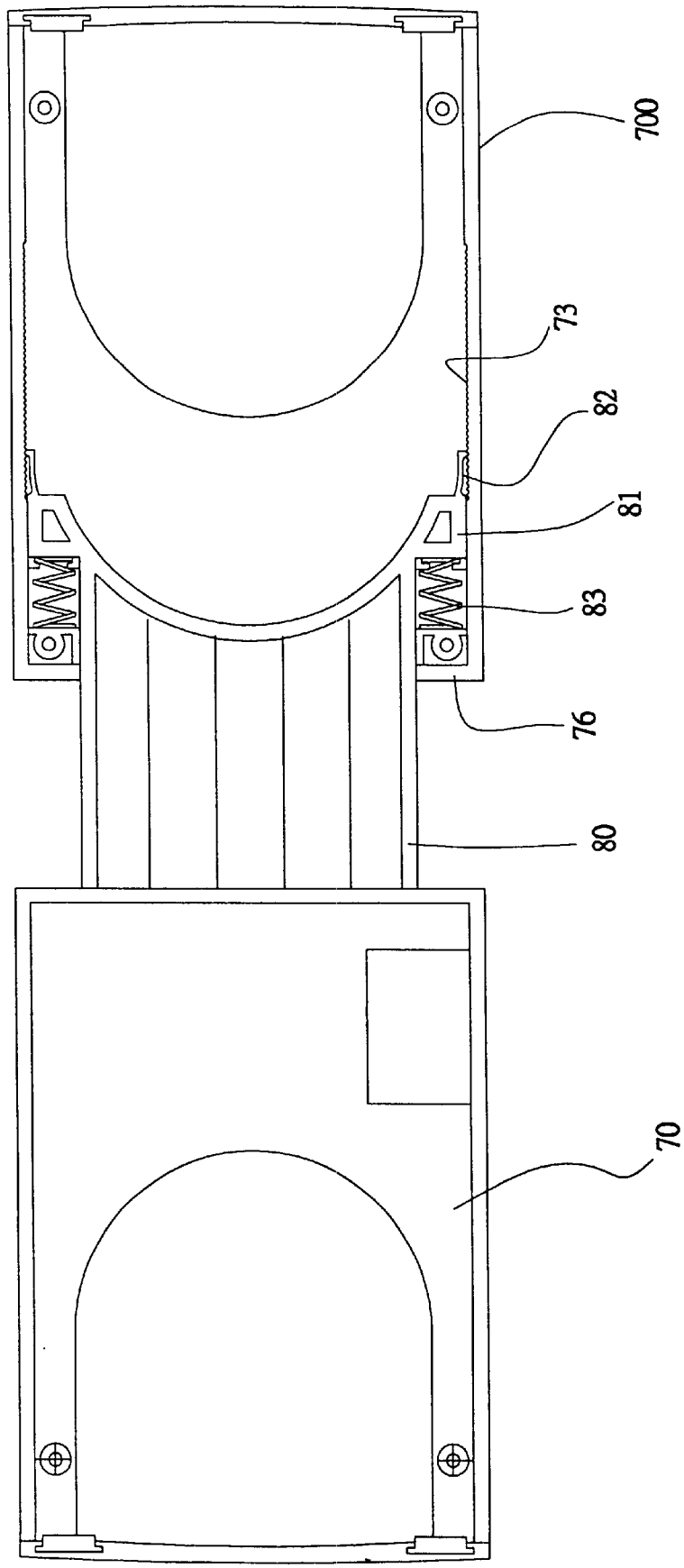
FIG. 3 a drawing of the structural status of two sliding members of the present invention pulled outward.
Figure 9:
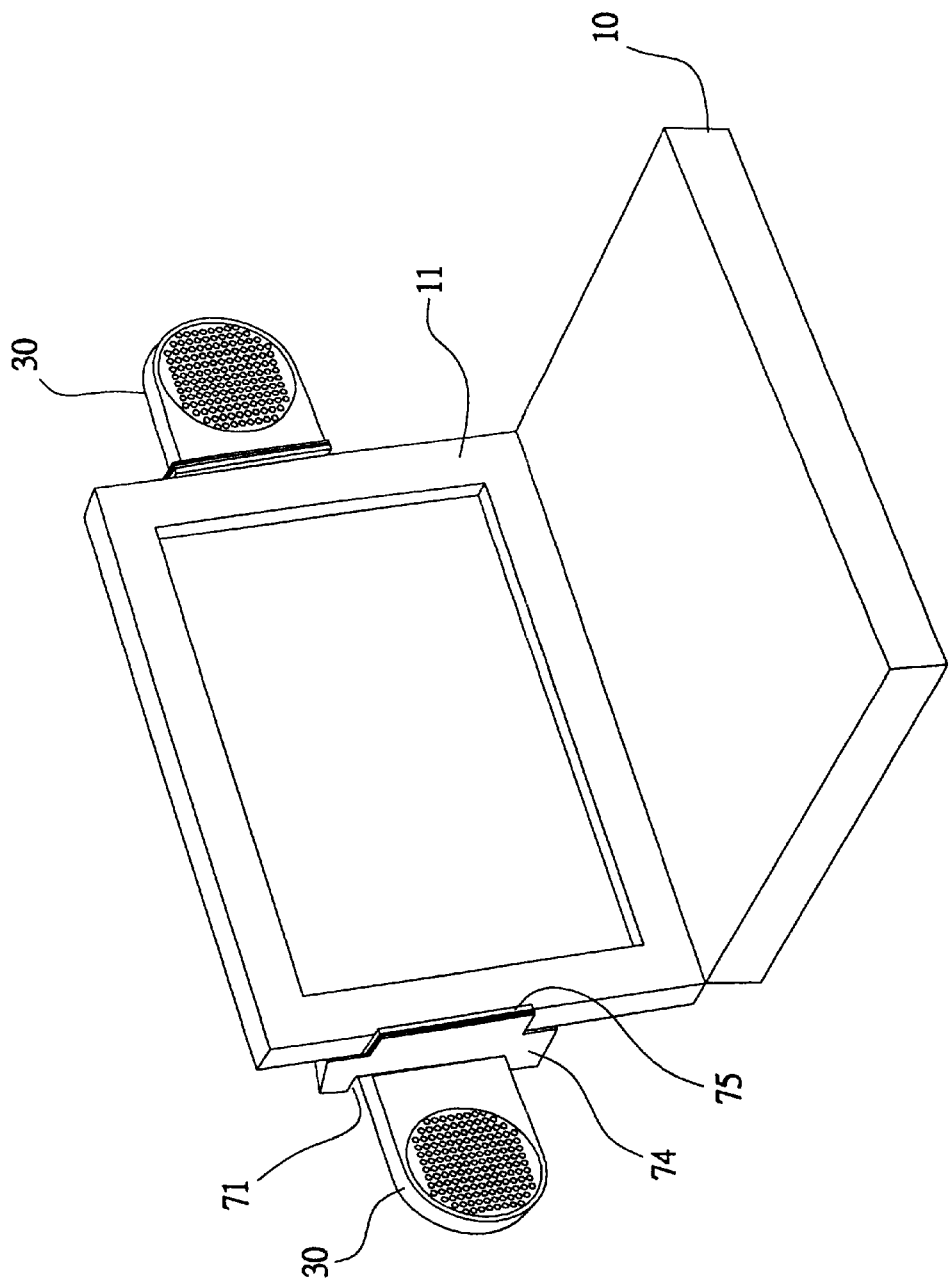
FIG. 9 is an external view drawing of the microadjusting action of the second exemplary embodiment of the present invention.

Referring to FIG. 2, the inverted plane structure of FIG. 1, wherein, two ends of the connecting piece (80) extend into the sliding member (70, 700) and fork to form a convex portion (81) respectively; a resilient retaining piece (82) is disposed in the front aspect of the convex portion (81); the end portion of the resilient retaining piece (82) presses against the inner lateral wall plane of the sliding members (70, 700); oppositely, a locating toothed strip (73) is disposed on the inner lateral wall plane in the said sliding members (70, 700) to make the resilient retaining piece (82) position in accordance with the locating toothed strip (73); a resilient element (83), such as a spring, is disposed at the rear end of the convex portion (81); referring to FIG. 3, when two sliding members (70, 700) are respectively pulled along the two ends of the connecting piece (80), the resilient element (83) is compressed between the convex portion (81) and the rib side (76) at the end portion of the sliding members (70, 700) to have a inward pulling force, referring to FIG. 5, to transversely mount the two sliding members (70, 700) on the screen (11), so the retaining sides (74) with convex tenons (75) are fixedly retained to the screen (11); after being connected with proper circuits, as shown in FIG. 9, when the computer main set (10) and the screen (11) are expanded to about 90 degree, the speaker box (50) is lifted from two sides to transmit the sound toward the most suitable area.

Figure 6:
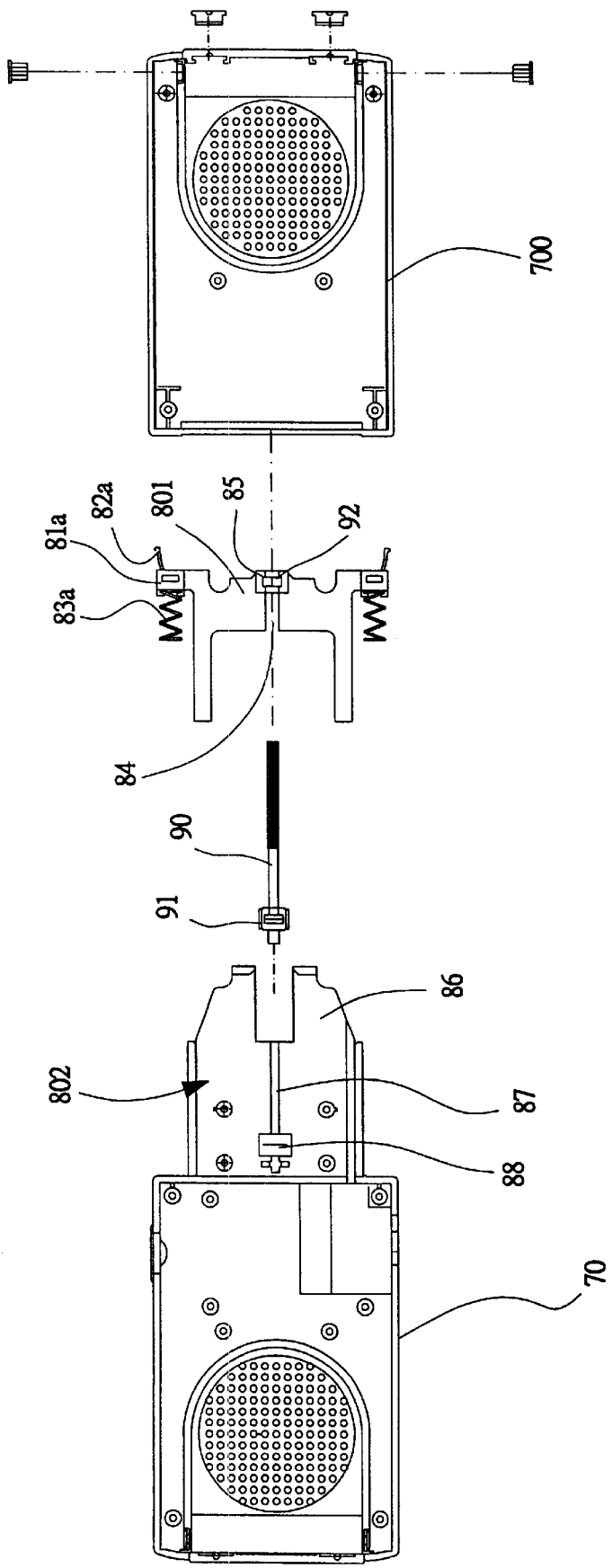
FIG. 6 is an exploded drawing of the plane of the second exemplary embodiment of the present invention.
Figure 7:
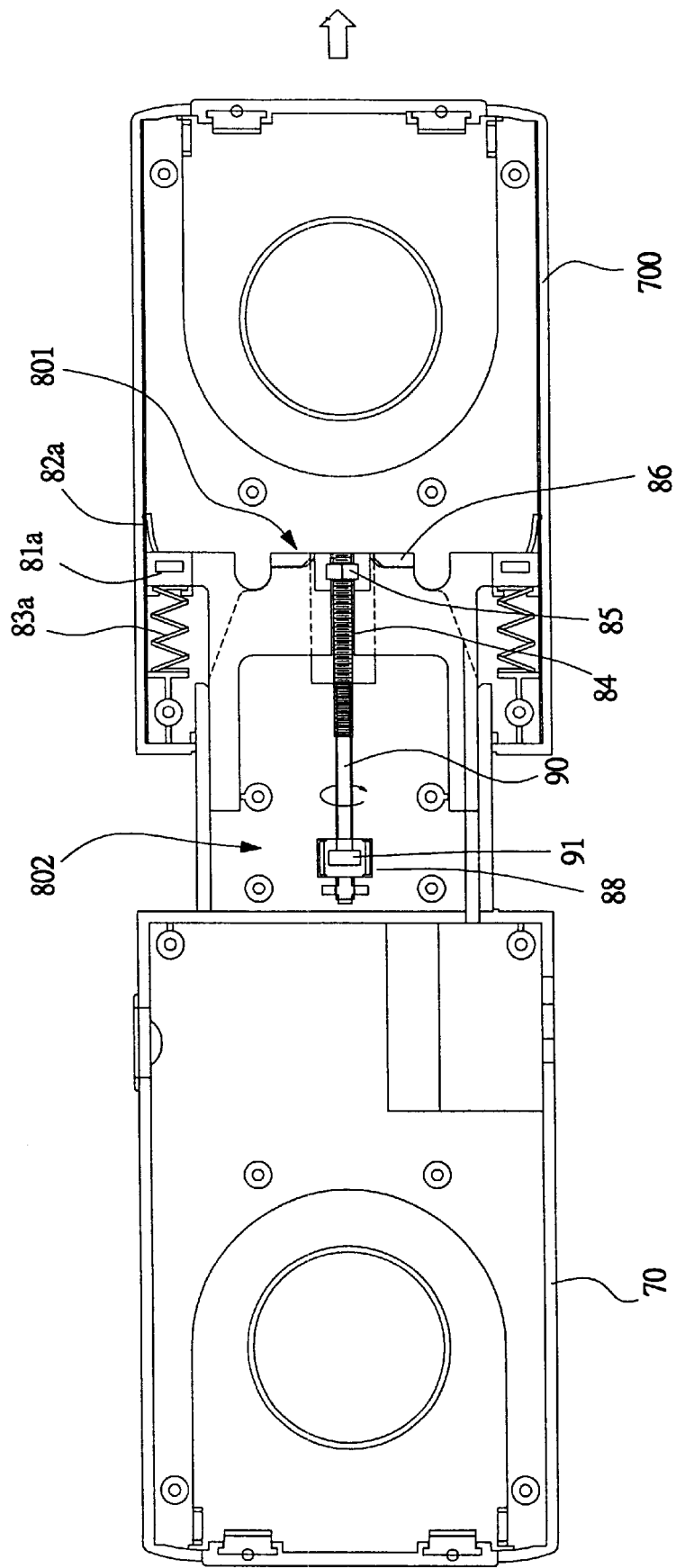
FIG. 7 is the first drawing of the microadjusting action of the second exemplary embodiment of the present invention.
Figure 8:
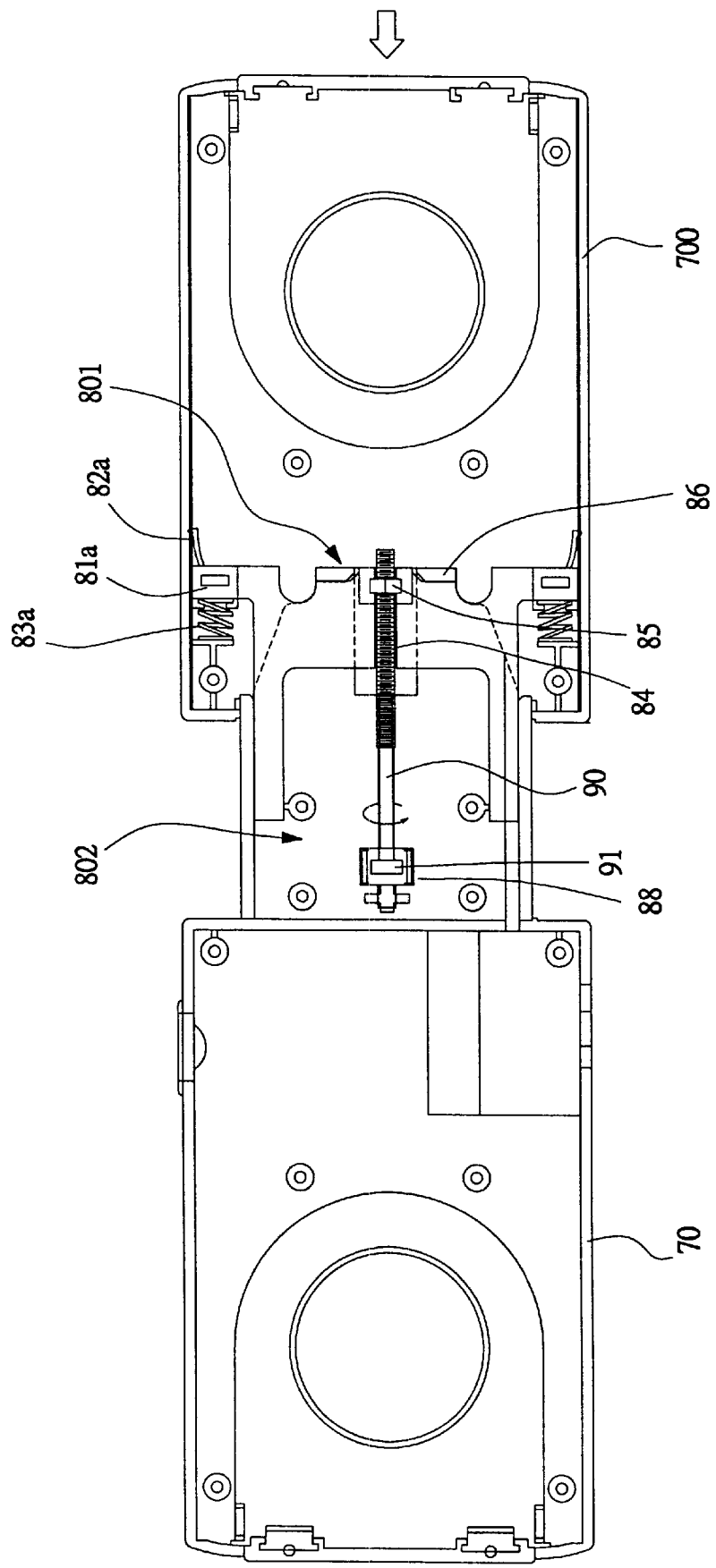
FIG. 8 is the second drawing of the microadjusting action of the second exemplary embodiment of the present invention.

The connecting piece (80), as shown in FIG.3, can be designed as a structure with microadjustment, referring to FIG. 6, the structure has been disassembled into two segments of a sliding block (801) and a body (802); wherein, the sliding block (801) is slightly in the form of a ⊂ shape with a guide slot (84) extends through the center and a fixing nut (85) is disposed at a proper position thereon; the two lateral end portions thereof also have a convex portion (81a) disposed respectively thereat as mentioned before; a resilient retaining piece (82a) and a resilient element (83a) are disposed respectively on the front and the rear sides of the convex portion (81a); two ends of the body (802) are formed respectively as two fork structures (86) with inserting and retaining functions; a guide slot (87) is disposed at the center and a expanded slot (88) is formed at the inner lateral end of the guide slot (87); referring to FIGS. 6 and 8, a threaded rod (90) with a pull block (91) at the distal end is disposed and received in the guide slot (87); the pull block (91) is fitly placed in the area of the expanded slot (88); the other end of the threaded rod (90) extends into the guide slot (84) of the sliding block (801) and is screwed to the fixing nut (85); the forks (86) of the body (802) are fixedly retained to the rear rim of the sliding block (801), as shown by the arrow, to clockwise push the pull block (91) to rotate the threaded rod (90) and make the sliding block (801) compress the resilient element (83a) to approach toward the body (802) along the threaded rod (90); oppositely, as shown in FIG. 7, the forks (86) anticlockwise push the pull block (91) to rotate the threaded rod (90) to loosen the resilient element (83a) so as to make the sliding block (801) to be pushed by the resilient element (83a) to move outward, thereby to achieve the objective of microadjusting the two sliding members (70, 700).

Figure 10:
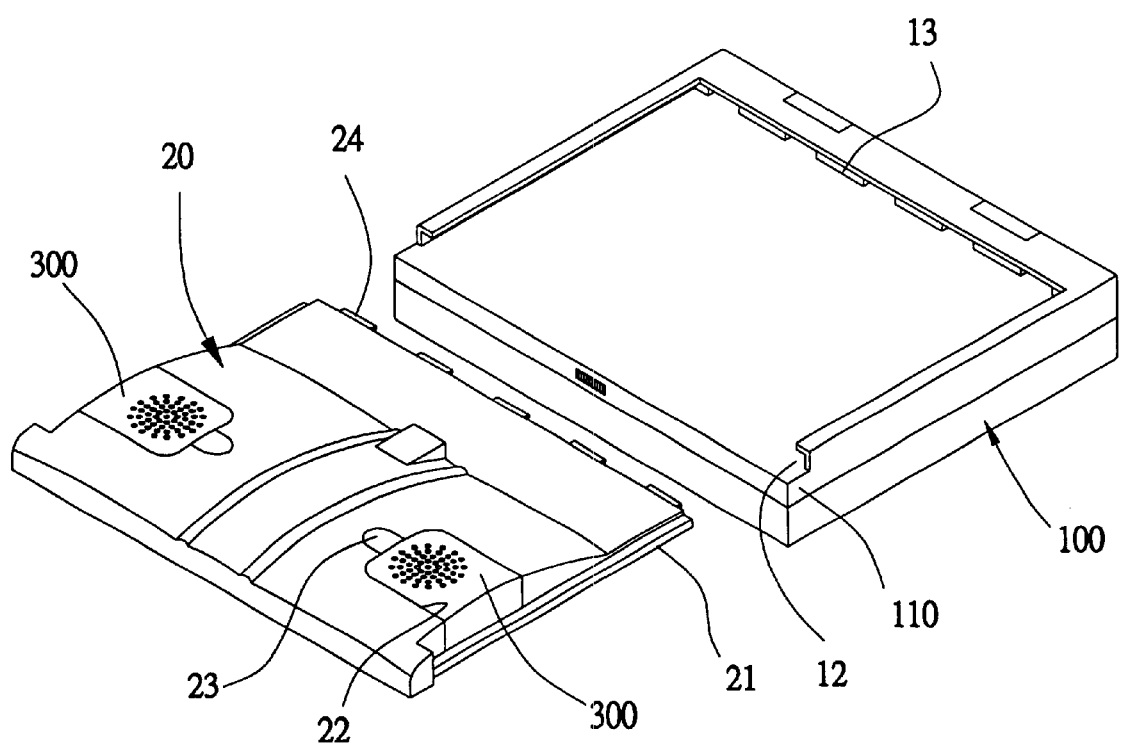
FIG. 10 is a drawing of the assembly of the third exemplary embodiment of the present invention.

The structure of another exemplary embodiment of the present invention, as shown in FIG. 10, is to dispose a concaved insert slot (12) on the back (outer) side of the screen (110) of the notebook computer main set (100); the two sides of the said insert slot (12) have two opposite ⊂-shaped structures and several retaining holes (13) disposed on the bottom rim.

Figure 11:
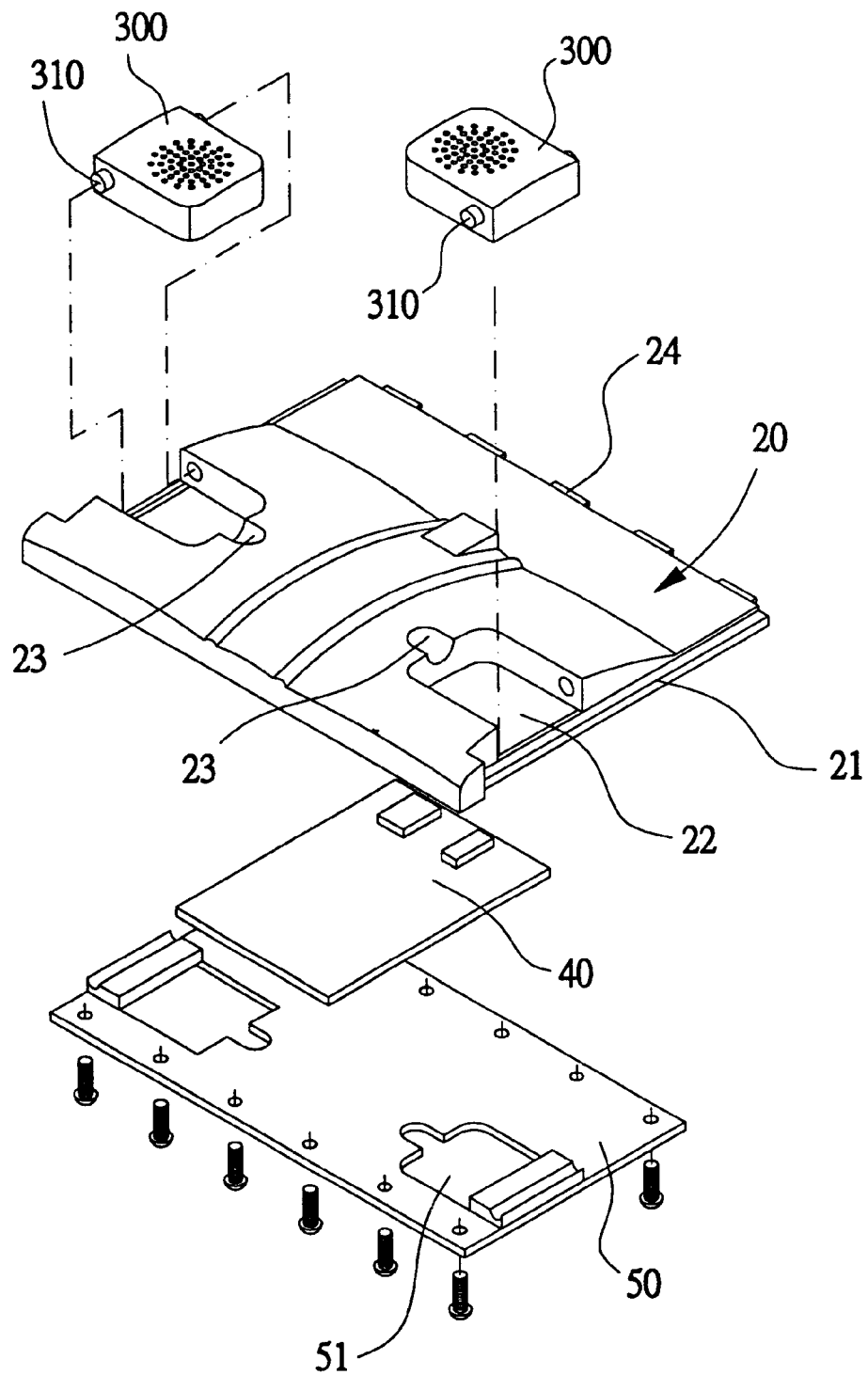
FIG. 11 is an exploded drawing of the third exemplary embodiment of the present invention.

Referring to FIGS. 10 and 11, a relative circuit board (40) is disposed inside a main body board (20) and sealed by a back plate (50); a rail strip (21) is disposed respectively on the two sides of the main body board (20) and several retaining tenons (24) are disposed at the bottom end; a box mounting slot (22) is disposed respectively at a proper position on the two sides of the main body board (20); a concave arch (23) is disposed on one side of the said box mounting slot (22); two speaker boxes (300) are disposed and pivots (310) are mounted at one end thereof; the said two speaker boxes (300) are respectively and pivotally jointed to the opposite sides of the concave arches (23) of the box mounting slots (22); through holes (51) in the same shapes are disposed on the back plate (50) opposite the box mounting slot (22).

Figure 12:
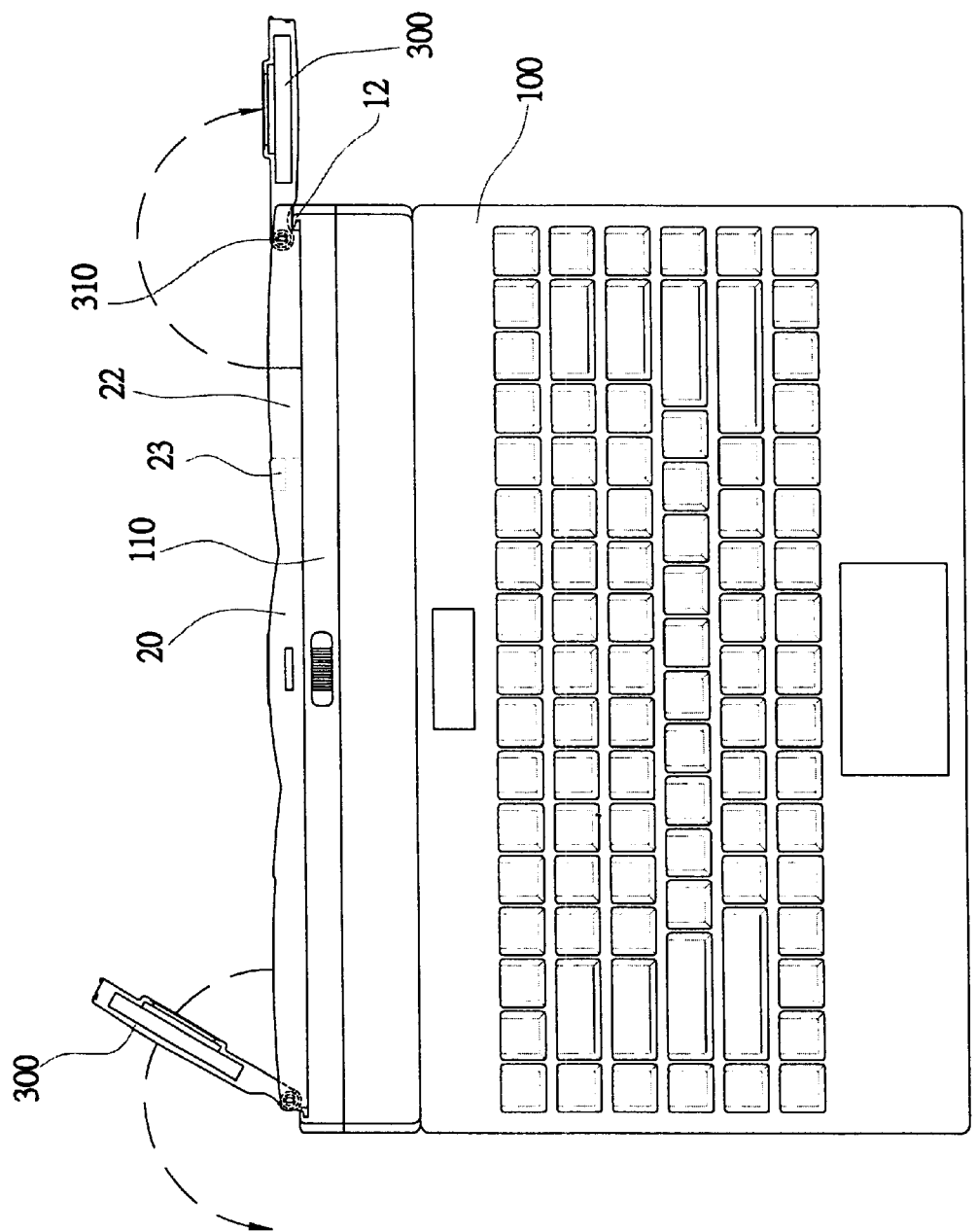
FIG. 12 is a bird's-eye view drawing of the third exemplary embodiment of the present invention.
Figure 13:
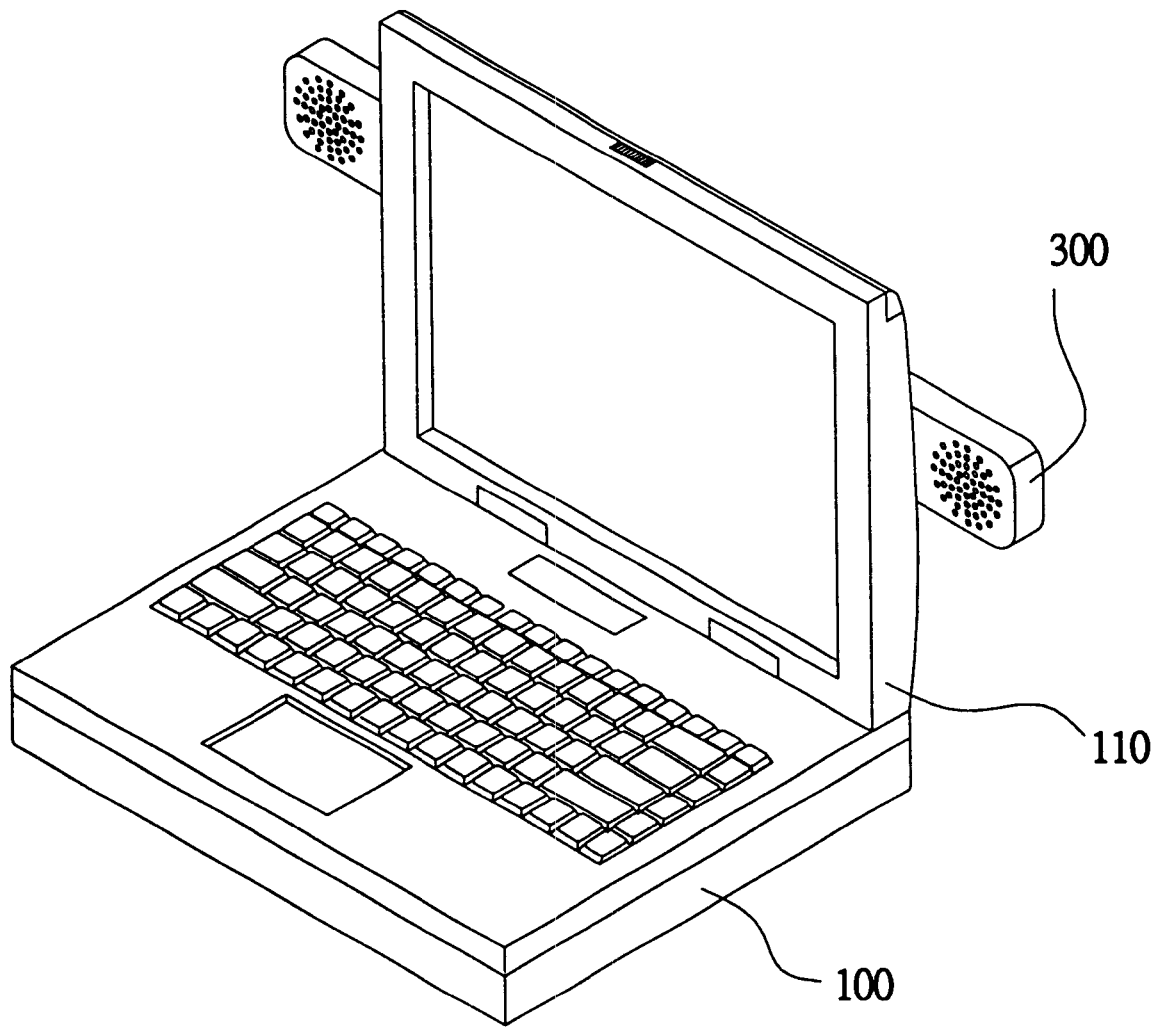
FIG. 13 is a pictorial drawing of the third exemplary embodiment of the present invention.

As shown in FIG. 10, the main body board (20) is inserted into the insert slot (12) by means of the rail strip (21); the retaining tenons (24) are inserted into the retaining holes (13) for fastening; when not in use, the speaker box (300) is received in the box mounting slot (22); when trying to use, as shown in FIGS. 10, 12 and 13, the notebook computer is activated and the screen (110) is in a vertical position, the speaker boxed (300) can be pulled out respectively from the box mounting slot (22) on the back side thereof; wherein the said concave arch (23) is provided for the finger to lift; the lifted speaker boxes (300) then protrude at two sides of the screen (110) and face directly across the user for obtaining the most stereo sound effect.

Furthermore, for the consideration of the external designs for various notebook computers, the main body board (20) can be molded unitarily with the outer case of the screen (110) and that should be included in the scope of the spirit of the present invention.

Figure 14:
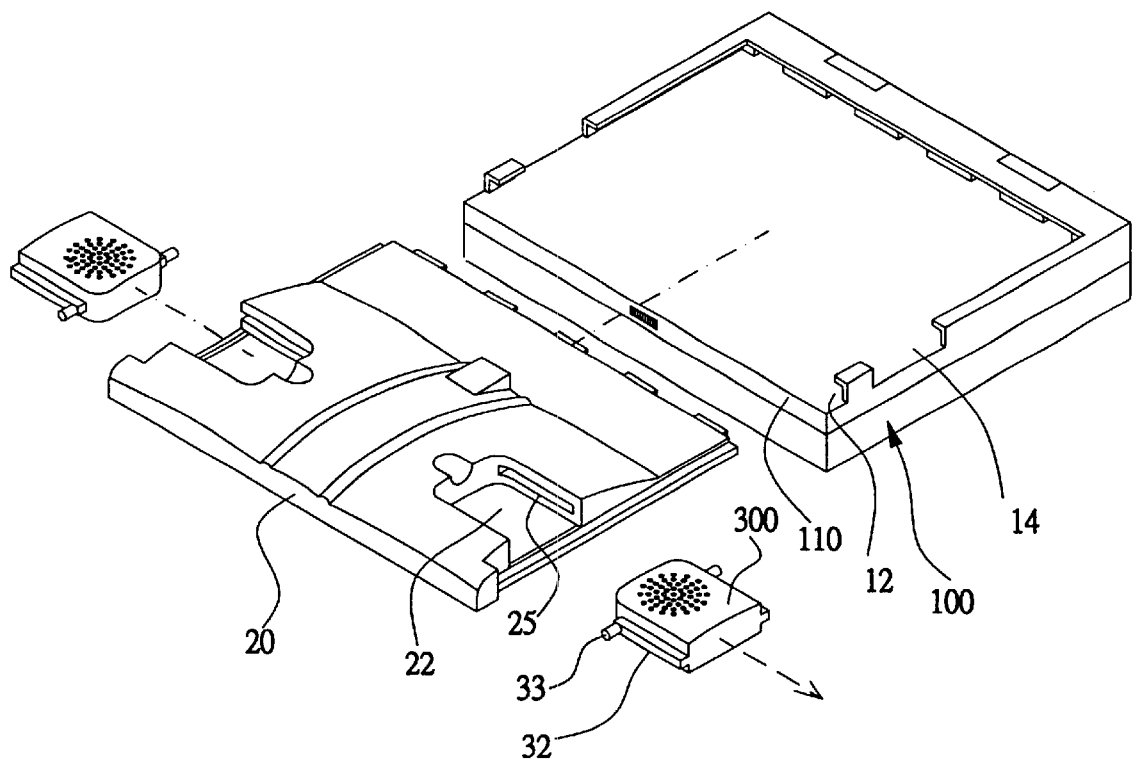
FIG. 14 is a structural drawing of another exemplary embodiment of the speaker of the present invention.
Figure 15:
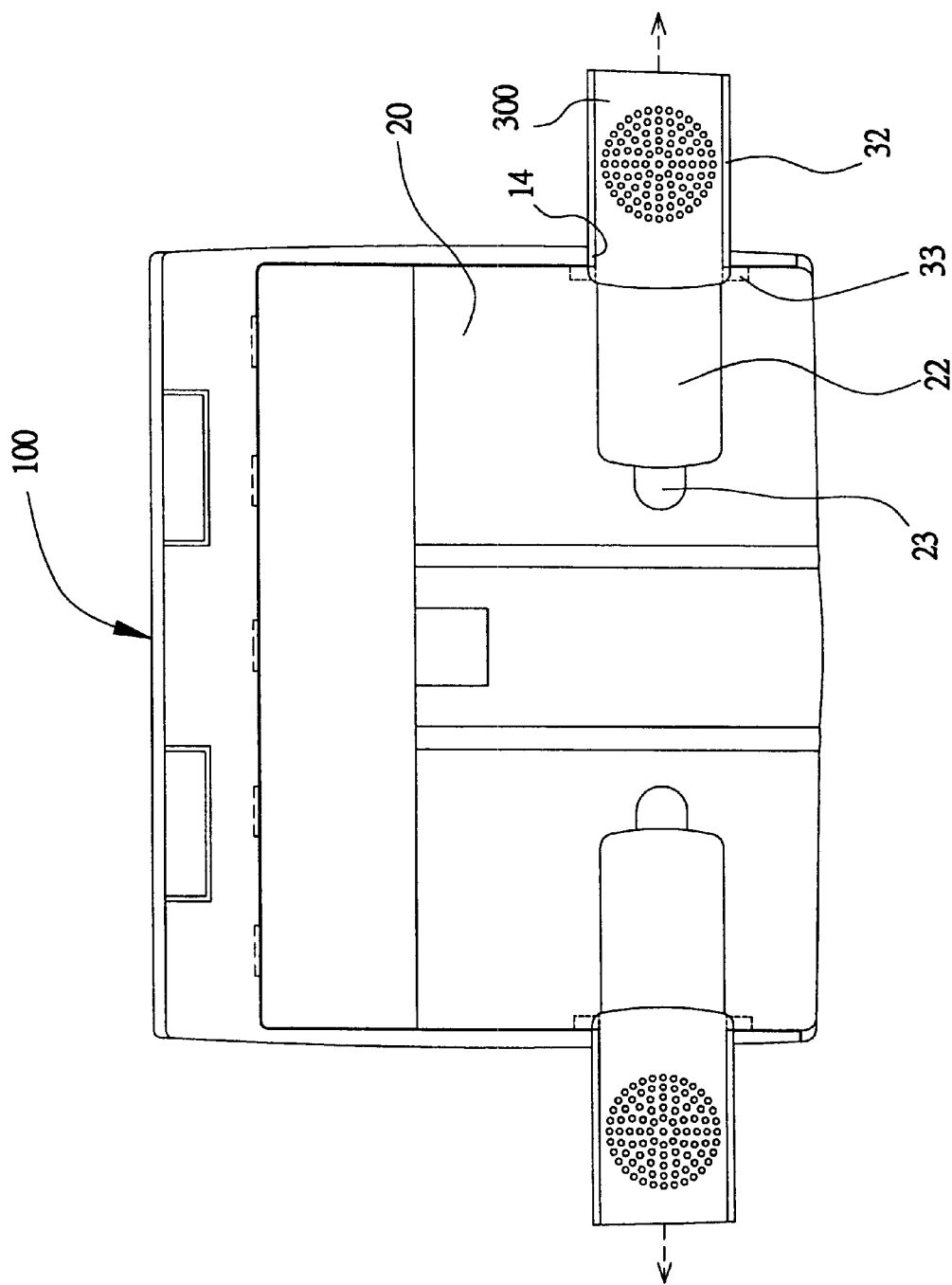
FIG. 15 is a schematic drawing of another exemplary embodiment of the speaker in use of the present invention.

Referring to FIGS. 14 and 15, another exemplary embodiment of the extracting structure of the speaker box (300) has notches (14) disposed opposite the speaker boxes (300) and on the ⊂-shaped structures at two sides of the insert slots (12) mounted on the back side of the said screen (110); two sliding channels (25) are disposed oppositely on two sides of the box mounting slot (22) in the main body board (20); sliding rails (32) and stop blocks (33) for preventing the derailment are disposed oppositely on the speaker boxes (300) disposed therein to allow the speaker box (300), as shown in FIG. 15, to be pulled outward straightly in a lateral direction for use; otherwise, the speaker box (300) can be received and that is very convenient for apllication.

Figure 16:
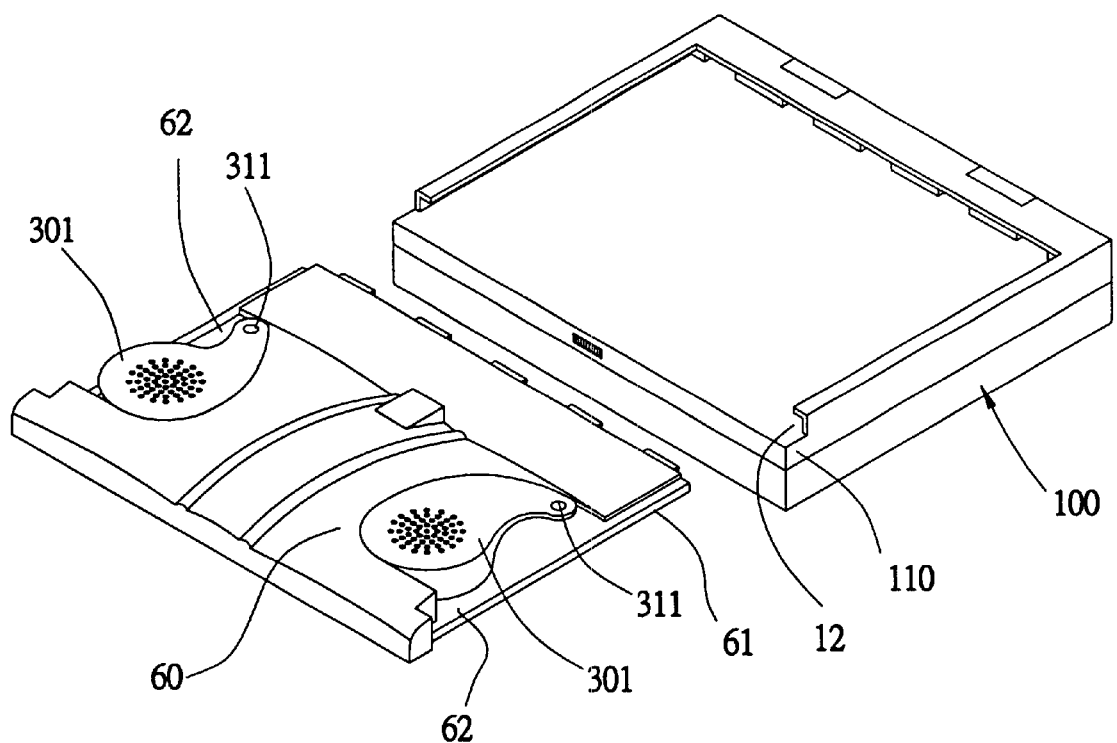
FIG. 16 is an exploded drawing of the fourth exemplary embodiment of the present invention.
Figure 17:
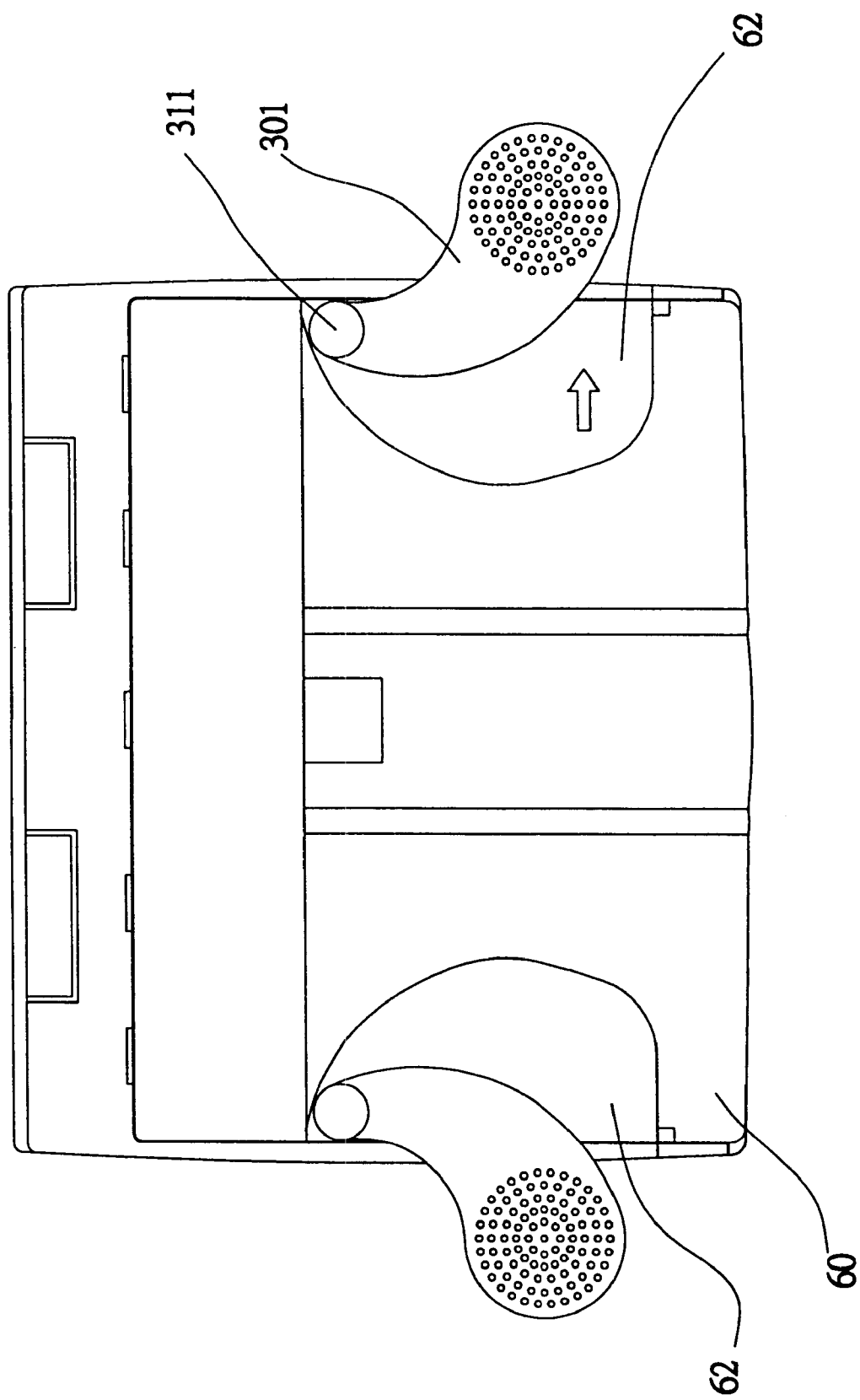
FIG. 17 a bird's-eye view and structural drawing of the fourth exemplary embodiment of the present invention.
Figure 18:
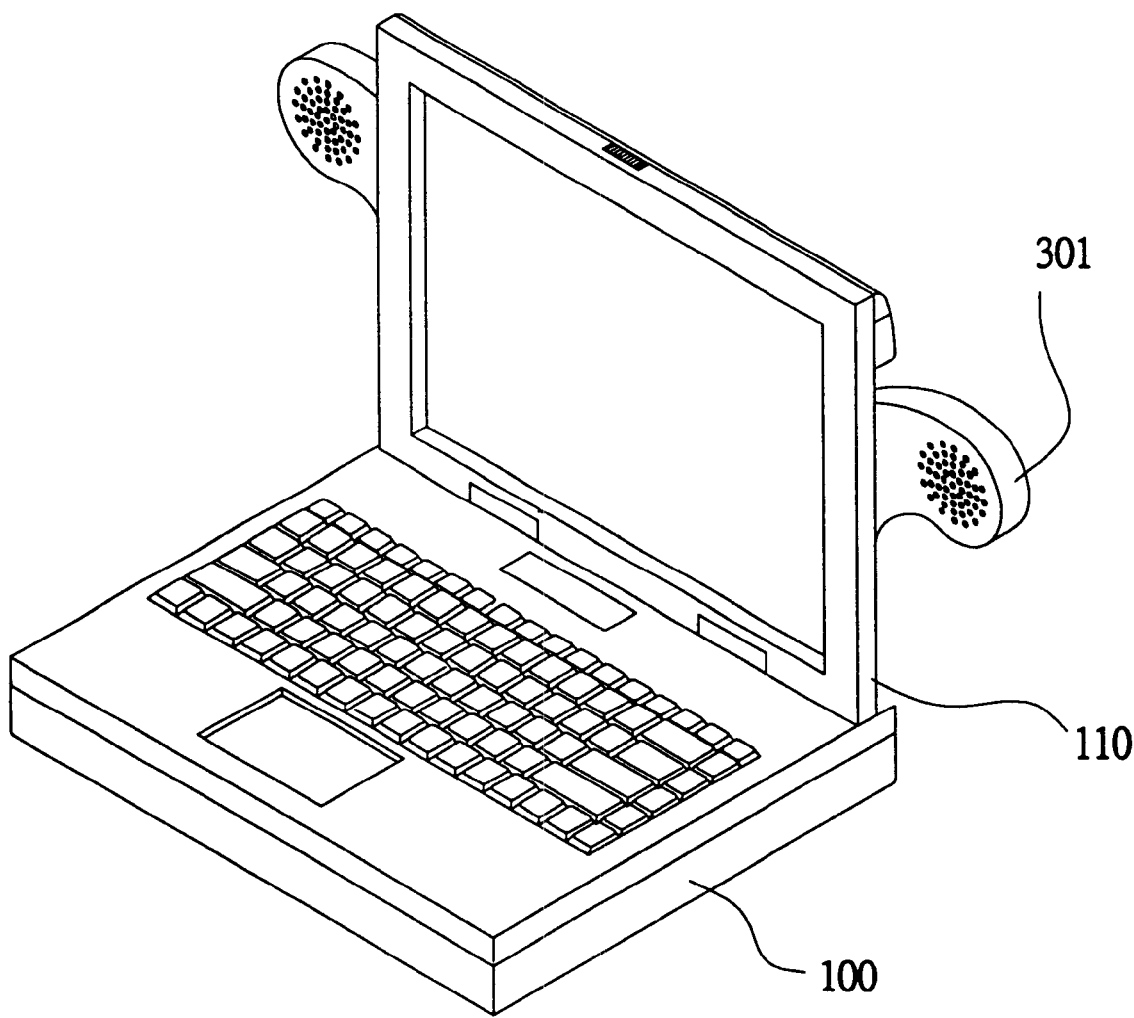
FIG. 18 is a structural and external view drawing of the fourth exemplary embodiment of the present invention.

Referring to FIGS. 16 and 17, another exemplary embodiment of the present invention, mainly on the two sides of the main body board (60), an arcuate box mounting slot (62) is disposed in the area where the rail strip (61) starts to concave toward the inner side; a long and arcuate speaker box (301) is slightly in the form of a water drop; a pivot (311) on one end thereof pivotally joints one end of the said long and arcuate speaker box (301) to one end of the said arcuate box mounting slot (62); the speaker box (301) not only can be received in the box mounting slot (62), as shown in FIG. 17, when centered by the pivot (311), the sound transmitting position on the other end of the speaker box (301) can also be pulled and turned outward the outer portion of the box mounting slot (62); when trying to use, as shown in FIG. 18, the speaker box (301) is pulled to expand and that is not only pleasant to the eyes, but also convenient for use.

Since the present invention has the special and innovative ideas, it has the following advantages for application:

1. The present invention provides the speaker box to face directly across the user for achieving the most stereo and real sound effect.
2. The present invention is a design of a speaker box convenient for expanding as well as being received and that facilitates the application and is incomparable with the common externally connected speaker box.
3. The position of the speaker box of the present invention can be rotated to adjust to a proper angle for obtaining the best direction for transmitting the sound and that is another feature of the present invention.
4. The present invention is disposed on the back side plane of the screen of the notebook computer, so it is volume-saving as well as light and handy in space utilization; that is another feature of the present invention.

What is claimed is:

1. An externally mounted speaker arrangement for a notebook computer having a screen, said speaker arrangement comprising:

a connecting piece and two sliding members, each sliding member having a concave opening that is disposed inwardly on an outer lateral end of the respective sliding member; two speaker boxes, two sides of one of the ends of each of the speaker boxes being pivotally jointed to an outer side end portion of the concave opening of one of the sliding members, permitting the speaker box to be folded into the sliding member or pulled outward; two retaining sides are disposed downward at the end portions of the two sliding members; the connecting piece has two end portions that extend into one of the sliding members and fork to form a convex portion; and a resilient element is disposed at a rear end of the convex portion, and when the two sliding members are pulled apart, the resilient element is compressed between the convex portion and a rib side at an end portion of said one of the sliding members to provide an inward pulling force to transversely mount the two sliding members on the screen, with the screen being gripped between the retaining sides.

2. An externally mounted speaker arrangement for a notebook computer according to claim 1, wherein a resilient retaining piece is connected to one of the ends of the connecting piece and presses against an inner wall of said one of the sliding members; a locating toothed strip is disposed on the inner wall of said one of the sliding members to make the resilient retaining piece position in accordance with the locating toothed strip.

3. An externally mounted speaker arrangement for a notebook computer according to claim 1, wherein the connecting piece comprises a sliding block and a body, the end portions of the connecting piece being disposed on the sliding block;

wherein the sliding block is generally c-shaped and has a guide slot extending through the center thereof; wherein the body has a guide slot is at the center thereof and a expanded slot is at an inner wherein a threaded rod is disposed in the guide slots of the body and the sliding block, wherein; pull block is disposed in the expanded slot and connected to the threaded rod; wherein the threaded rod is rotated and make the sliding block approach toward or to move away from the body along the threaded rod, thereby to achieve the objective of microadjusting the two sliding members.

\* \* \* \* \*